April 8, 1941.  W. L. HANSEN ET AL  2,237,962
METHOD FOR MAKING MOTOR ROTORS
Original Filed July 3, 1939
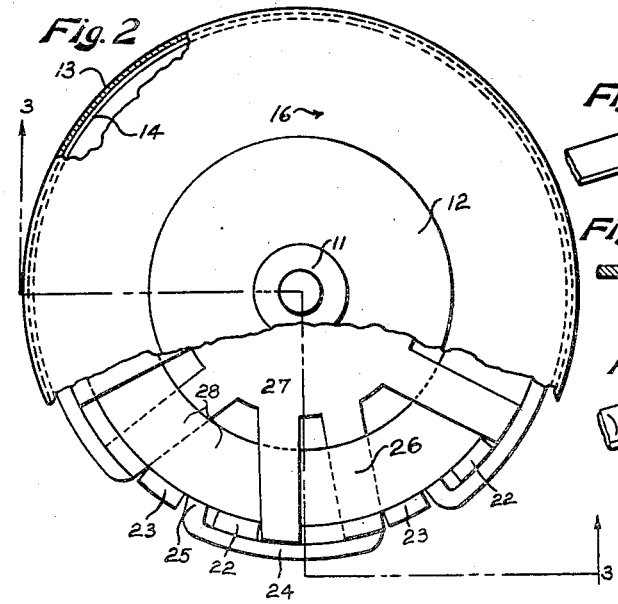
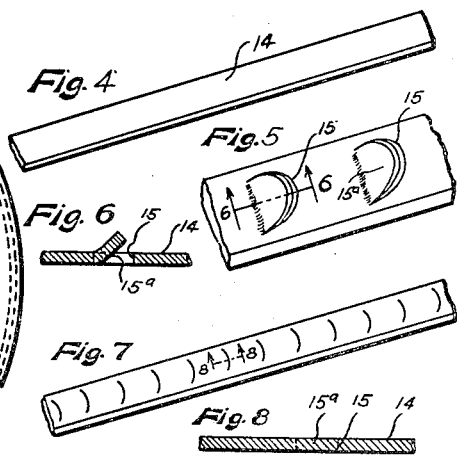
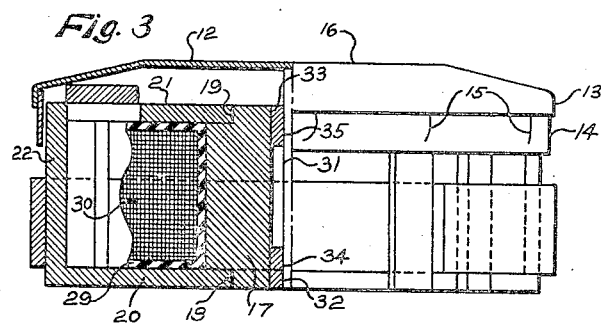
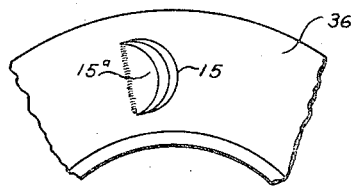
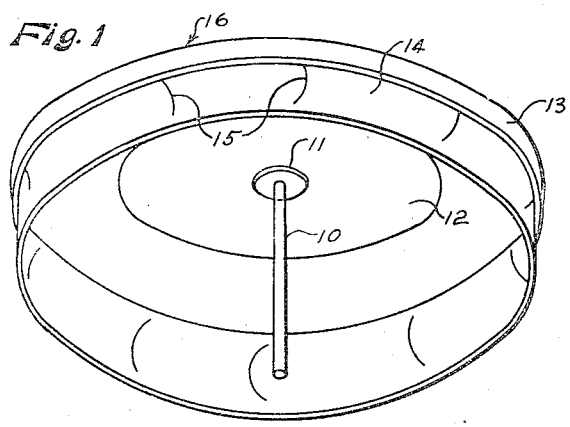
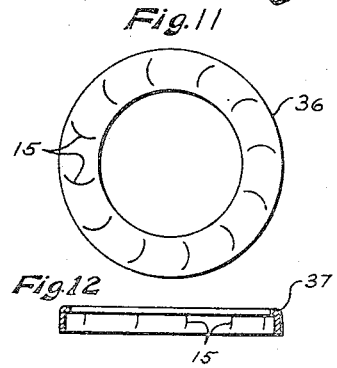
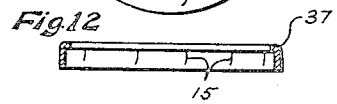
INVENTORS
WILLIAM L. HANSEN
IRA N. HURST
BY
ATTORNEYS Patented Apr. 8, 1941

2,237,962

UNITED STATES PATENT OFFICE 2,237,962

METHOD FOR MAKING MOTOR ROTORS

William L. Hansen and Ira N. Hurst, Princeton, Ind., assignors to Hansen Manufacturing Company, Inc., Princeton, Ind., a corporation of Indiana Original application July 3, 1939, Serial No. 282,719. Divided and this application April 15, 1940, Serial No. 329,696

5 Claims. (Cl. 172—120)

This invention relates to electrical synchronous motors, and in particular, to rotors for such motors and processes of making such rotors.

One object of this invention is to provide a rotor for an electrical synchronous motor including a substantially cylindrical band of magnetic material having a plurality of incisions therein for providing pole pieces.

Another object is to provide such a rotor wherein the incisions constitute substantially arcuate slots formed in the cylindrical band.

Another object is to provide a rotor comprising a shaft with a support thereon having a peripheral flange, and a cylindrical band of magnetic material disposed within said flange and having a plurality of incisions therein forming pole pieces.

This application is a division of our application, Serial No. 282,719, filed July 3, 1939.

In the drawing:

Figure 1 is a perspective view of a preferred embodiment of the rotor of this invention.

Figure 2 is a front elevation of a motor employing the rotor of this invention, the rotor being partly broken away to disclose the structure behind it.

Figure 3 is a partially sectional side elevation along the line 3—3 in Figure 2.

Figure 4 is a perspective view of a strip of magnetic material from which the rotor band may be made.

Figure 5 is a perspective view showing the strip of Figure 4 provided with incisions to form upstanding tabs.

Figure 6 is a section along the line 6—6 in Figure 5.

Figure 7 is a view similar to Figure 5, but showing the finished band with the tabs bent back into alignment with the remainder of the strip.

Figure 8 is a section along the line 8—8 in Figure 7.

Figure 9 is an elevation of a ring of magnetic material from which the rotor may be made by a modified procedure.

Figure 10 is an enlarged view of a portion of the ring shown in Figure 9 with an incision made therein, and a tab struck upwardly therefrom.

Figure 11 is a view similar to Figures 9 and 10, but in a later stage of manufacture with the tabs bent backward into alignment with the remainder of the ring.

Figure 12 is a view of the finished rotor band with a portion of the ring of Figure 11 bent into cylindrical form.

Referring to the drawing in detail, Figure 1 shows the rotor of this invention as consisting of a shaft 10 having a hub 11 with a web 12 extending outwardly therefrom, and having a peripheral flange 13. Mounted within the flange 13 is a rotor band 14 of substantially cylindrical form. This rotor band 14 is preferably of magnetic steel and may be formed either in a single piece or in the form of a strip which is sprung into the space within the flange 13, as hereinafter explained. The rotor band 14 is provided with circumferentially spaced incisions 15, which serve to interrupt the magnetic path and in this manner to provide pole pieces around the rotor band 14.

The rotor of Figure 1, generally designated 16, is shown in position upon a motor in Figures 2 and 3. This motor may be of any suitable type, the type shown being described and claimed in our copending application, Ser. No. 282,718, filed July 3, 1939. This motor consists of a magnetic core 17 having reduced diameter portions 18 and 19, upon which are mounted outer and inner pole members 20 and 21, respectively.

The outer pole member 20 is provided with axially extending pole pieces 22 and 23, which are alternately encircled by an undulating shading member 24 of non-magnetic metal, such as copper. The shading member 24 passes over the outer surfaces of the pole pieces 22 and their undulating portions 25 extend substantially around three sides of each pole piece 23, leaving the outer surface thereof exposed. In this manner the outer pole pieces 23 are shaded, whereas the outer pole pieces 22 are left unshaded.

The inner pole member 21 is provided with radiating pole pieces 26 and 27, the tips of which extend outward into close proximity to the tips of the outer pole pieces 22 and 23. The inner pole pieces 27 are shaded by a shading ring 28 having undulating portions 29 passing around three sides of each inner pole piece 27, but passing over one surface only of each pole piece 26. In this manner the inner pole pieces 27 are shaded, whereas the inner pole pieces 26 are left unshaded. The shading ring 28 is likewise of non-magnetic metal, such as copper.

In order to energize the field structure thus described the core 17 is encircled by a grooved insulating member 29 having a field energizing winding 30 therein. The core 17 is provided with a bore 31 with plugs 32 and 33 having coaxial bores 34 and 35 for rotatably supporting the rotor shaft 10. The rotor band 14 is then disposed adjacent the tips of the outer and inner pole members 22, 23, 26 and 27. The incisions 15 provide for pole areas in the rotor band 14 so that the band has a variable magnetic reluctance.

The manufacture of rotor band 14 may be accomplished in two different ways. By the first process (Figures 4 to 8) a strip 14 of magnetic steel is punched with incisions 15. During the punching process tabs 15a are struck up from the surface of the strip 14, as shown in Figures 5 and 6. Subsequently, however, these tabs 15a are pushed or bent back into alignment with the remainder of the strip 14, as shown in Figures 7 and 8. The strip may then be sprung into cylindrical shape and inserted within the flange 13, where it is held in place by its natural resilience.

In the second process of manufacture a ring 36 of magnetic steel is selected and provided with incisions 15, spaced circumferentially therearound by a punching process as shown in Figure 10. During the punching process tabs 15a are raised above the adjacent surface of the ring 36, as shown in Figure 10. Subsequently, however, these tabs 15a are bent or pushed back into alignment with the remainder of the ring, as shown in Figure 11. The ring is then subjected to the action of mating dies so that the peripheral portion of the ring 36 is drawn into an axial cylindrical flange 37. By this means the rotor band may be made in a single piece.

It will be understood that we desire to comprehend within our invention such modifications as come within the scope of the claims and the invention.

Having thus fully described our invention, what we claim as new and desire to secure by Letters Patent, is:

1. In a process of making a rotor, forming spaced transverse incisions in a strip of magnetic material while striking up portions of the strip adjacent said incisions, and bending the struck-up portions back into alignment with the remainder of the strip.

2. In a process of making a rotor, forming spaced transverse incisions of substantially U-shaped form in a strip of magnetic material while striking up portions of the strip adjacent said incisions, and bending the struck-up portions back into alignment with the remainder of the strip.

3. In a process of making a rotor, forming spaced transverse incisions in a ring of magnetic material while striking up portions of the strip adjacent said incisions, and bending the struck-up portions back into alignment with the remainder of the strip.

4. In a process of making a rotor, forming spaced transverse incisions in a ring of magnetic material while striking up portions of the strip adjacent said incisions, bending the struck-up portions back into alignment with the remainder of the strip, and bending the edge portion of said ring into a substantially cylindrical shape.

5. In a process of making a rotor, forming spaced transverse incisions in a ring of magnetic material while striking up portions of the strip adjacent said incisions, bending the struck-up portions back into alignment with the remainder of the strip, and bending the edge portion of said ring into a substantially cylindrical shape while leaving the opposite edge portion of the ring to form a flange.

WILLIAM L. HANSEN.
IRA N. HURST.